United States Patent [19]

Ijuin et al.

[11] Patent Number: 4,959,536
[45] Date of Patent: Sep. 25, 1990

[54] SHEET CONVEYING AND READING APPARATUS HAVING A LIGHT-INTERCEPTING MEMBER FOR REDUCING NOISE

[75] Inventors: Kazuya Ijuin, Tokyo; Shinnichiro Otsuki, Yokohama; Yuji Nakano, Yokosuka; Hiroshi Ogushi, Tokyo, all of Japan

[73] Assignee: Canon Kabushiki Kaisha, Tokyo, Japan

[21] Appl. No.: 477,112

[22] Filed: Feb. 7, 1990

Related U.S. Application Data

[63] Continuation of Ser. No. 212,656, Jun. 28, 1988, abandoned.

[30] Foreign Application Priority Data

Jul. 6, 1987 [JP] Japan .................................. 62-167053
Jul. 6, 1987 [JP] Japan .................................. 62-167057

[51] Int. Cl.$^5$ ............................................. H01J 3/14
[52] U.S. Cl. ................................... 250/216; 358/482
[58] Field of Search .............. 250/216, 560, 559, 561, 250/223 R; 355/68; 358/296, 482, 483; 356/432, 433, 434, 141; 271/262, 265

[56] References Cited

U.S. PATENT DOCUMENTS

| | | | |
|---|---|---|---|
| 3,890,049 | 6/1975 | Collins et al. | 250/559 |
| 3,932,755 | 1/1976 | Sagawa | 250/559 |
| 4,200,391 | 4/1980 | Sakamoto et al. | 355/68 |
| 4,352,553 | 10/1982 | Hirahara | 355/68 |
| 4,438,918 | 3/1984 | Ito et al. | 271/251 |
| 4,544,258 | 10/1985 | Takano | 250/216 |
| 4,560,866 | 12/1985 | Takenouchi et al. | 250/216 |
| 4,729,036 | 3/1988 | Ikeda et al. | 358/296 |

*Primary Examiner*—David C. Nelms
*Attorney, Agent, or Firm*—Fitzpatrick, Cella, Harper & Scinto

[57] ABSTRACT

A sheet conveying and reading apparatus has a conveyance path for conveying a sheet, a transparent plate for contacting the surface of the sheet being conveyed on the conveyance path, a photoelectric conversion element disposed on the transparent plate or in proximity to the surface thereof opposite to the surface of the transparent plate contacting the sheet, and a light-intercepting member for covering the side edge surfaces of the transparent plate.

30 Claims, 3 Drawing Sheets

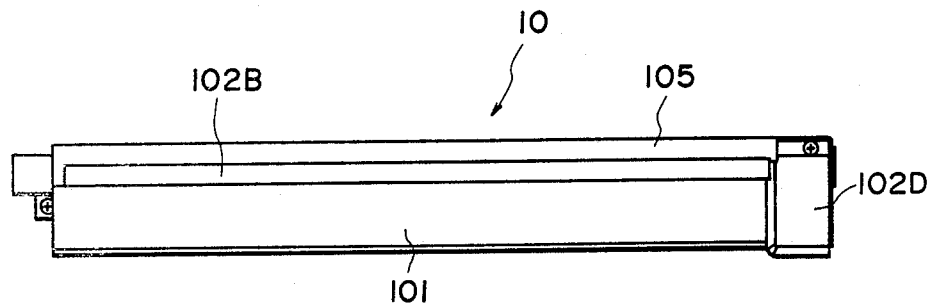
F I G. 4
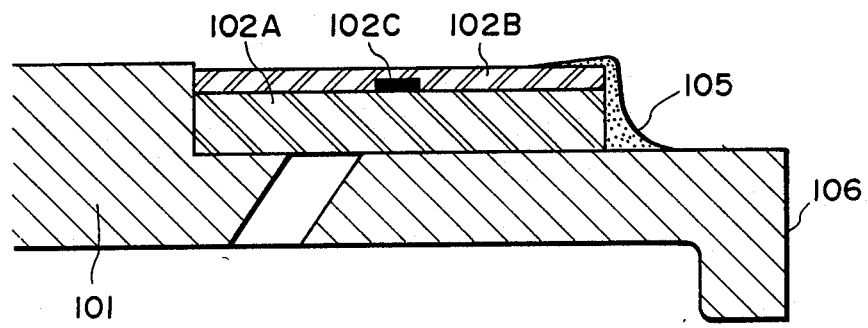
F I G. 5
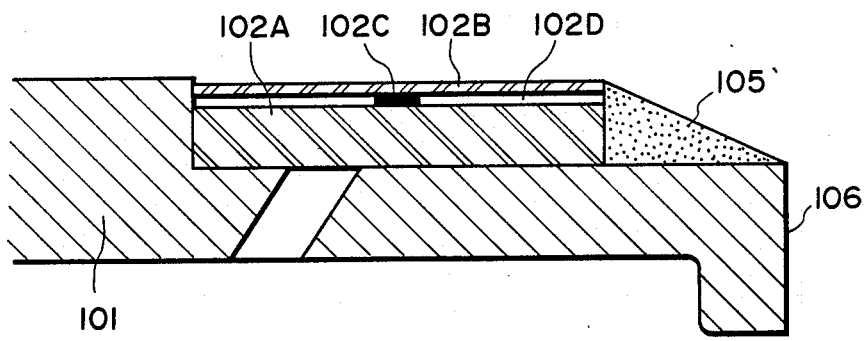
F I G. 6

SHEET CONVEYING AND READING APPARATUS HAVING A LIGHT-INTERCEPTING MEMBER FOR REDUCING NOISE

This is a continuation of application Ser. No. 212,656, filed June 28, 1988, now abandoned.

BACKGROUND OF THE INVENTION

1. Field of the Invention

This invention relates to an apparatus for conveying a sheet such as an original and at the same time, reading images such as characters formed on the sheet. An apparatus of this type is often used, for example, in a facsimile apparatus or the like.

2. Related Background Art

An apparatus of this type is disclosed, for example, in U.S. Pat. No. 4,438,918. In this apparatus, a sheet (an original) is conveyed along a predetermined conveyance path by conveying rollers. A slit is provided in the course of the conveyance path, and a light is applied to the original through the slit and the reflected light therefrom is imaged on an image sensor by a lens to thereby read the image of the original. The image sensor comprises a photoelectric conversion element disposed on a base plate widthwise of the original, and the light reflected from the original is received and converted into an electrical signal by the photoelectric conversion element.

In such an apparatus, however, the image sensor can be disposed at a location within the apparatus into which it is difficult for outside light to enter, but a lens, a reflecting mirror, etc. are required, and this leads to bulkiness of the apparatus.

So, the assignee of the present invention has developed a reading apparatus for reading the image of an original directly by an image sensor without the use of a lens, a reflecting mirror, etc. In this reading apparatus, a photoelectric conversion element is provided on a transparent plate disposed on a base plate having a hole for passing therethrough the light beam from a light source, and the photoelectric conversion element is covered with a protective transparent sheet. When the original is to be read, the reflected light of said light beam applied to the original, which is being conveyed while contacting said protective transparent sheet, is received and converted into an electrical signal by the photoelectric conversion element.

In this reading apparatus, however, only the protective transparent sheet lies between the photoelectric conversion element and the sheet conveyance path and therefore, outside light which has entered into the sheet conveyance path through the inlet and/or the outlet for the sheet readily enters the photoelectric conversion element. Particularly, part of the outside light enters the element through the side edge surfaces of the transparent plate and the protective transparent sheet and provides a disturbing light, and this has led to the problem that such light appears as a noise signal in the photoelectric conversion element.

There has also been the problem that if the photoelectric conversion element is always exposed to the outside light, the element deteriorates more rapidly than otherwise.

SUMMARY OF THE INVENTION

It is an object of the present invention to solve the above-noted problems and to provide a compact sheet conveying and reading apparatus.

It is a further object of the present invention to provide a sheet conveying and reading apparatus in which an image sensor means does not receive disturbing light and accordingly a photoelectric conversion element produces no noise signal and is not subject to early deterioration.

The present invention has as its premise an apparatus having conveying means for conveying a sheet on a set path, and image sensor means having its light-receiving surface located on said set path and contacting one surface of the sheet being conveyed. In such apparatus, the image sensor means has a photoelectric conversion element extending on a base plate width-wisely of the sheet, and the image sensor means is comprised of a photoelectric conversion element and a protective transparent sheet successively provided on a transparent plate disposed in a recess formed in the upper surface of the base plate, and the side edge surfaces of said transparent plate are covered with a light-intercepting member.

BRIEF DESCRIPTION OF THE DRAWINGS

FIG. 4 is a plan view of the image sensor means.

FIG. 5 is an enlarged cross-sectional view of the image sensor means.

FIG. 6 shows another embodiment of the image sensor means.

DESCRIPTION OF THE PREFERRED EMBODIMENTS

Figure 1:
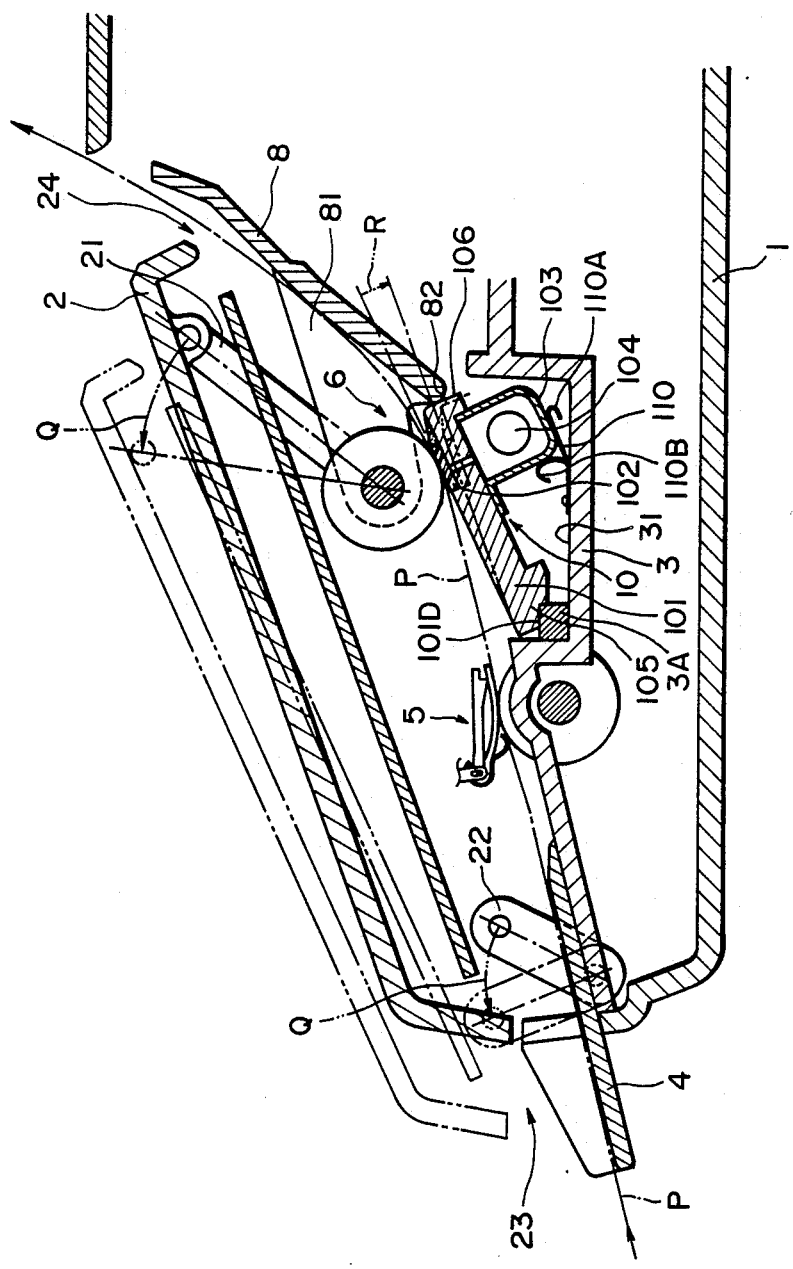
FIG. 1 is a longitudinal cross-sectional view schematically showing the construction of an apparatus according to an embodiment of the present invention.

The preferred embodiments of the present invention will hereinafter be described with reference to the drawings FIG. 1 is a cross-sectional view schematically showing the construction of a facsimile apparatus as an apparatus according to an embodiment of the present invention.

Referring to FIG. 1, a support base plate 3 is provided at an intermediate location in a frame member 1, and various means for defining a predetermined conveyance path P for a sheet such as an original (not shown) are provided thereon. That is, a planar original receiving plate 4 is provided at the entrance side in the direction of conveyance of the original, and front-stage conveyor means 5, rear-stage conveyor means 6, image sensor means 10 and an original carrying-out guide plate 8 are successively provided in the direction of conveyance, whereby the conveyance path P is formed. A lid member 2 is provided so as to be openable and closable within a predetermined range in such a manner as to cover the various means provided along the conveyance path P.

Figure 2:
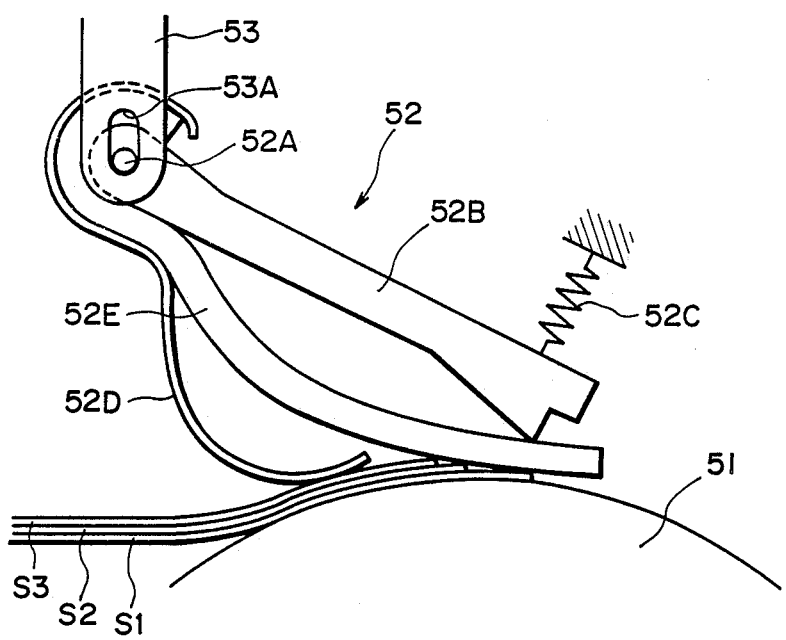
FIG. 2 is an enlarged view of the front-stage conveying means of the FIG. 1 apparatus.

The front-stage conveyor means 5 disposed at a downstream position on the original receiving plate 4 with respect to the direction of conveyance comprises a front-stage roller 51 for conveyance located under the conveyance path P and having its outer periphery in contact therewith, as shown in detail in FIG. 2, and a contact member 52 which is in contact with the front-stage roller 51 from above the latter. The contact member 52 has a support member 52B supported at one end for pivotal movement about a pin 52A which provides a fulcrum and downwardly urged near the other end by a spring 52C, a first member 52D of a spring material held at said one end in a cantilever fashion by the support member 52B, and a second member 52E such as a rubber plate.

When the original is not being conveyed, the first member 52D and the second member 52E are resiliently urged into contact with each other at a position which is proximate to or in contact with the front stage roller 51. The state of contact is such that a substantially wedge-shape space is formed at the entrance side for the original so as to readily receive the leading end of the original thereinto. The relation between the coefficients of friction of the two members is set so that the frictional force with the roller 51 is greater in the second member 52E than in the first member 52D. Such a contact member 52 is supported by the pin 52A so as to be vertically movable within a predetermined range in a slot 53A formed in a fixed support member 53.

Figure 3:
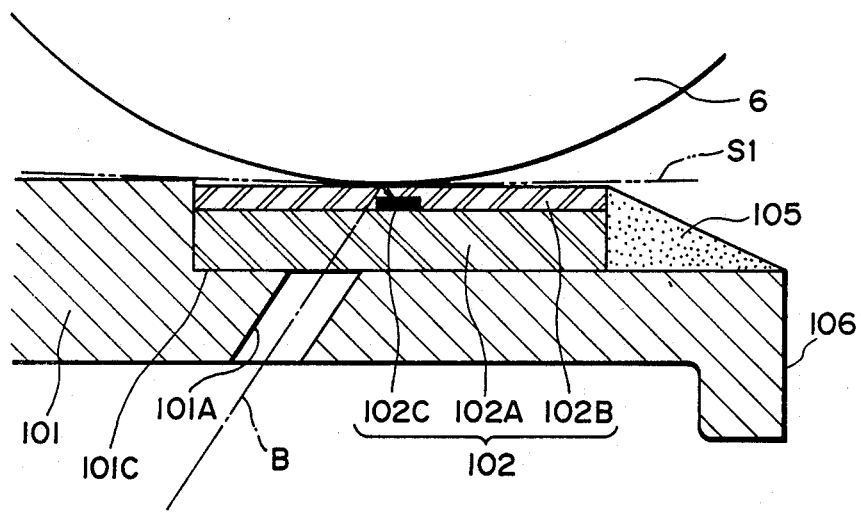
FIG. 3 is an enlarged cross-sectional view of the vicinity of the photoelectric conversion element of the image sensor means of the apparatus of FIG. 1.

Turning back to FIG. 1, the image sensor means 10 is disposed in a recess 31 formed in the intermediate portion of the support base plate 3, and a rear-stage roller 6 as rear-stage conveyor means is in contact with the image sensor means 10. The image sensor means 10 is provided with a light-receiving portion 102 including a photoelectric conversion element in a stepped portion (recess) formed in the upper surface of a base plate 101, as shown in FIG. 3.

A cover 103 is attached to the underside of the base plate 101, and a xenon tube 104 as a light source is disposed in the cover 103 (see FIG. 1). The base plate 101 is provided with an engagement portion 101D engaged with a corner of a support block 3A provided on the support base plate 3. The support base plate 3 is supported for some movement by the support block 3A. Also, the base plate 101 has a fiducial end surface 106 accurately dimensioned in a direction perpendicular to the plane of the drawing sheet, i.e., in the width-wise direction of the original. On the other hand, the carrying-out guide plate 8 fixedly provided relative to the support base plate 3 has an arm 81 for rotatably supporting the opposite ends of the rear-stage roller 6 by the opposite ends thereof in a direction perpendicular to the plane of the drawing sheet.

Further, a fiducial end surface 82 extending in a direction perpendicular to the plane of the drawing sheet and parallel to the axis of the rear-stage roller 6 is formed on the lower portion of the carrying-out guide plate 8 and is adapted to bear against the fiducial end surface 106 of the base plate 101. The cover 103 attached to the base plate 101 is urged upwardly and rightwardly by a spring 110 having one end fixed to the support base plate 3 and the other end or the free end opened substantially into a V-shape. That is, the spring 110 has its free end formed into a comb-tooth-like shape so as to form a V-shape by the comb teeth being alternately bent, and each of the comb teeth is substantially independently resiliently deformable.

One side 110A of the spring 110 which is opened into a V-shape bears against the bottom of the cover and urges the base plate 110 against the roller 6. The other side 110B of the spring 110 urges the fiducial end surface 106 of the base plate 110 against the fiducial end surface 82.

The light-receiving portion 102 provided on the stepped portion of the base plate 101 comprises a photoelectric conversion element 102C disposed on a transparent plate 102A such as a glass plate and a protective transparent sheet 102B such as a glass sheet provided thereon. The photoelectric conversion element 102C is located at the portion of contact with the rear-stage roller 6, and is positioned parallel to the fiducial end surface 106 of the base plate 101. Further, the right end surfaces (the forward end surfaces as viewed in the direction of conveyance) of the transparent plate 102A and the protective transparent sheet 102B are covered with a triangular light-intercepting member 105 thinning in the rightward direction. The light-intercepting member 105 is not limited in its material, but may be provided by simple application of a coating material to said end surfaces, adhesion of a tape or the like to said end surfaces, or partial rising of the base plate 101, and the shape thereof may be various if it is such as to increase the space between it and the conveyance path P in the direction of conveyance.

Next, as shown in FIG. 1, the lid member 2 is adapted to be capable of being opened as a two-lever crank mechanism in the direction of arrow in FIG. 1 by levers 21 and 22 pivotable in two forward and rearward positions in the direction of conveyance between it and the support base plate 3. In the case of the present embodiment, the right lever 21 is longer than the left lever 22 and therefore, the lid member 2 may be opened more widely on the right side.

Here, one of the pin couplings between the lid member 2 and the two levers 21, 22 is adapted to be capable of being released in a set opening position as required. For example, one of the pins can be removed in said opening position, whereby the lid member 2 can be opened upwardly widely in the fashion of a door by the other lever. Further, in a part of said two-lever crank mechanism, a cam (not shown) may be provided, for example, at the lower fulcrum of the lever 21, and during the opening operation of said crank mechanism, the base plate 101 of the image sensor means 7 may be downwardly urged by the cam against the force of the spring 110 so that a predetermined gap can be provided between the base plate 101 and the rear-stage roller 6.

Although not shown, other members such as a recording unit, etc., necessary as parts of the facsimile apparatus are contained in the space at the right of the support base plate 3.

Operation of the apparatus of the present embodiment constructed as described above will now be described.

A plurality of originals are first inserted from the left-hand side of FIG. 1 along the original receiving plate 4. The originals are inserted until they are held between the front-stage roller 51 and the first member 52D. At this time, the originals are smoothly held between the front-stage roller 51 and the first member 52D because the first member 52D is formed of a material of low coefficient of friction and the front-stage roller 51 is of a shape which forms a wedge-shaped space between it and the first member 52D. The originals are thus held between the front-stage roller 51 and the first member 52D and therefore, even if the original receiving plate 4 forms an upward slope as shown, the originals will not fall.

Also, the first member 52D and the second member 52E are supported for vertical movement within a predetermined range in the slot 53A of the fixed support member 53 by the pin 52A and therefore, even if a number of originals are inserted at one time, the frictional forces of the first and second members with the roller are prevented from becoming excessively great by the fulcrum of the contact member 52 being retracted and therefore, it will never happen that two or more originals are fed out at one time, and this contributes to the avoidance of trouble.

When the front-stage roller 51 is rotated, a conveyance force is imparted to the lowermost original S1 of the originals S1, S2 and S3, and then the originals S2 and S3 thereon are also fed out by the frictional force between the originals. Each original is conveyed until the leading end thereof bears against the second member 52E. Since the second member 52E and the front-stage roller 51 form a wedge-shaped space therebetween, the originals S1–S3 inserted with their leading ends flush are held therebetween with their leading end edges deviated from one another in succession as shown in FIG. 2, and the originals are reliably conveyed one by one in the order of S1, S2 and S3 by the frictional force with the front-stage roller 51. At that time, the frictional force with the front-stage roller 51 is greater on the second member 52E than on the first member 52D and therefore, while the first member holds down the second and subsequent originals S2 and S3, only the first original S1 is reliably conveyed as a result.

The original S1 thus singly fed on the conveyance path P then passes over the image sensor means 10 with the aid of the rear-stage roller 6. The light beam B emitted from the light source 104 passes through a hole 101A in the base plate 101 as shown in FIG. 3, is applied to the original S1 and is reflected by the original, and is converted into an electrical signal by the photoelectric conversion element 102C, and this signal is read.

At that time, the fiducial end surface 106 of the base plate of image sensor means bears against the fiducial end surface 82 of the carrying-out guide plate 8 supporting the rear-stage roller 6, by the force of the spring 110, and therefore, the degree of parallelism of the rear-stage roller 6 and the photoelectric conversion element in a direction perpendicular to the plane of the drawing sheet and the positional relation therebetween which have been initially set with high accuracy are not destroyed but remain stable. Further, the spring 110 forms a plurality of substantially independent resiliently urging portions arranged in a direction perpendicular to the plane of the drawing sheet and therefore, even if there is some manufacturing error in the contact pressure of the rear-stage roller 6 with respect to the photoelectric conversion element, such error will be sufficiently compensated for and a uniform contact state will be maintained in said direction. Thus, the reading in the photoelectric conversion element is accomplished with good accuracy and with stable sensitivity.

Also, light enters through an original insertion port 23 formed between the lid member 2 and the original receiving plate 4 and an original discharge port 24 formed between the lid member 2 and the original carrying-out guide plate 8. However, the upstream side end portions of the transparent plate 102A and the protective transparent plate 102B are shielded from light by the base plate 101, and the downstream side end portions thereof are shielded from light by the light-intercepting member 105. Accordingly, the early deterioration of the photoelectric conversion element by the outside light is prevented. Also, the production of noise during the reading of the original can be prevented and stable reading of the original can be accomplished.

Thus, as the reading of the original progresses, the original S1 is carried out of the apparatus while being guided on the carrying-out guide plate 8. At that time, the dust, paper powder, etc., adhering to the original may collect near the photoelectric conversion element 102C to adversely affect the reading accuracy.

In the present embodiment, however, the light-intercepting member 105 is inclined in the direction of conveyance and forms a gradually widening space between it and the conveyance path P and thus, as the original is conveyed, the aforementioned dust, paper powder, etc., are removed from the image sensor means 10 and do not collect near at least the photoelectric conversion element 102C, and predetermined reading accuracy is maintained. That is, even if dust, paper powder, etc., adhere to the surface of the protective transparent sheet 102B, they are wiped off by the sheet S1 being conveyed and move to the downstream side end portion of the protective transparent sheet 102B, and fall down the inclined surface of the light-intercepting member 105.

Description will now be made of a countermeasure for so-called jams during the conveyance of the original.

In the prior-art apparatus, jamming has been coped with by pivoting the lid member greatly about one end thereof to open it in the fashion of a door. In this case, one end of the lid member is widely open but the vicinity of the center of pivotal movement is not much opened and therefore, when jam has occurred near the center of pivotal movement, it has been impossible to provide a sufficient gap for drawing out the original therethrough.

In the apparatus of the present embodiment, the lid member 2 is opened with a predetermined spacing over the whole range in the direction of arrow Q by the two-lever crank mechanism having the levers 21 and 22 and therefore, even if a jam occurs anywhere in the apparatus, the original can be easily drawn out. Moreover, with the pivotal movement of said levers, image sensor means 10 is downwardly urged by a cam (not shown) and is rotated in the direction of arrow R to thereby provide a sufficient gap between it and the rear-stage roller 6 and therefore, a jam can be easily coped with. In that case, if the right lever 21 is longer than the left lever 22, the degree of opening of the right lever will become greater, and this is convenient. Further, in the present embodiment, the link coupling between one lever and the lid member 2 can be released in a predetermined open position as required and therefore, at that point of time, the lid member can be opened in the fashion of a door like the conventional lid member, whereby any other trouble than a jam can be coped with.

In the above-described embodiment, the front-stage roller 51 is disposed below the sheet, but alternatively, it may be disposed above the sheet and the first member 52D and the second member 52E may be disposed below the sheet.

Also, the front-stage roller 51 may be replaced by a conveyor belt. Where a conveyor belt is employed, the first and second members should be constructed in such a shape that a space spreading toward the upstream side is formed between the conveyor belt and the first member and between the conveyor belt and the second member.

FIG. 4 is a plan view of the image sensor means 10. In FIG. 4, the reference character 102D designates a case in which is contained a driving circuit for the image sensor means The light-intercepting member 105 may be provided only in the downstream side end portion, but may be provided also in the side edge portion as shown, as required.

FIG. 5 shows an example which uses an epoxy adhesive agent as the light-intercepting member of the image sensor means. An opaque (black) epoxy adhesive agent is applied to the end portions of the transparent plate 102A and the protective transparent sheet 102B and is solidified. In the example shown in FIG. 5, the epoxy adhesive agent is thinly applied also to a part of the surface of the protective transparent sheet 102B to thereby enhance the light-intercepting effect. In this case, if the epoxy adhesive agent is applied too thickly to the surface of the protective transparent sheet 102B, the leading end of the original being conveyed will be caught by it or dust, paper powder, etc., will collect on it. Consequently, the epoxy adhesive agent is applied as thinly as possible, and is preferably applied in a wedge shape so that no level difference is formed between it and the protective transparent sheet 102B.

FIG. 6 shows another embodiment of the image sensor means. In FIG. 6, the photoelectric conversion element 102C is placed on the transparent plate 102A, and further, the protective transparent plate 102B is secured to the transparent plate 102A by means of a transparent adhesive agent. Accordingly, a layer of transparent adhesive agent is provided between the transparent plate 102A and the protective transparent plate 102B.

The photoelectric conversion element 102C may be protected by a transparent layer so as not to be in direct contact with the original For example, a transparent and fluid protective agent may be applied onto the photoelectric conversion element and solidified. Alternatively, from the first, the photoelectric conversion element may be embedded in a glass plate.

What is claimed is:

1. A sheet conveying and reading apparatus comprising:
    a conveyance path for conveying sheets;
    a transparent plate having a first surface at least a part of which is for contacting a surface of the sheets being conveyed on said conveyance path, and having a second surface opposed to said first surface;
    a photoelectric conversion element abutting said second surface of said transparent plate, for reading an image on a conveyed sheet; and
    a light-intercepting member for covering a side edge surface of said transparent plate to prevent light from entering said side edge surface.

2. A sheet conveying and reading apparatus according to claim 1, further comprising conveying means disposed in said conveyance path for conveying the sheet while urging the sheet against said transparent plate.

3. A sheet conveying and reading apparatus according to claim 2, further comprising feed means for separating and feeding piled sheets one by one, disposed upstream of said conveying means with respect to a direction of conveyance of the sheets along said conveyance path.

4. A sheet conveying and reading apparatus according to claim 1, wherein said photoelectric conversion element is in contact with said transparent plate.

5. A sheet conveying and reading apparatus according to claim 1, wherein said photoelectric conversion element is embedded into said transparent plate.

6. A sheet conveying and reading apparatus according to claim 1, further comprising a cover member for covering said conveyance path, said cover member having a receiving port for receiving a sheet therein and a discharge port discharging a sheet therethrough.

7. A sheet conveying and reading apparatus according to claim 6, wherein said side edge surface of said transparent plate is opposed to said receiving port or said discharge port, and wherein said light-intercepting member covers said side edge.

8. A sheet conveying and reading apparatus according to claim 1, wherein said light-intercepting member has a surface covering a downstream side end surface of said transparent plate with respect to the direction of conveyance of the sheet and becomes lower toward the downstream side with respect to a direction of conveyance of the sheet.

9. A sheet conveying and reading apparatus according to claim 1, further comprising a second transparent plate on the side opposite to said first surface of said transparent plate, and wherein said photoelectric conversion element is disposed between said transparent plate and said second transparent plate, and said light-intercepting member covers also a side edge surface of said second transparent plate.

10. A sheet conveying and reading apparatus according to claim 9, further having illuminating means for illuminating the surface of said sheet through said transparent plate and said second transparent plate, and wherein said photoelectric conversion element reads an image formed on the surface of said sheet illuminated by said illuminating means.

11. A sheet conveying and reading apparatus according to claim 1, wherein said photoelectric conversion element is disposed in a recess formed in said transparent plate.

12. A sheet conveying and reading apparatus according to claim 1, wherein said light-intercepting member includes paint coated on said side edge surface.

13. A sheet conveying and reading apparatus according to claim 1, wherein said light-intercepting member covers a side edge surface from which light is incident.

14. A sheet conveying and reading apparatus having:
    first conveying means for conveying a sheet;
    a first transparent plate having a first surface at least a portion of which is for contacting a surface of the sheet conveyed by said first conveying means, and a second surface opposite said first surface;
    a second transparent plate disposed on the second surface of said first transparent plate;
    a photoelectric conversion element abutting the second surface of said first transparent plate, for reading an image on the sheet;
    a light-intercepting member for covering side edge surfaces of said first and second transparent plates to prevent light from entering the side edge surfaces;
    second conveying means for imparting a conveyance force to the sheet while urging the sheet against said first transparent plate; and illuminating means for illuminating the surface of said sheet through said first and second transparent plates.

15. A sheet conveying and reading apparatus according to claim 14, wherein said first conveying means lies upstream of said second conveying means with respect to a direction of conveyance by said first conveying means, and further comprising separating means disposed adjacent said first conveying means for separating one sheet from a plurality of sheets in cooperation with said first conveying means.

16. A sheet conveying and reading apparatus according to claim 14, further comprising holding means for holding said first and second transparent plates and said photoelectric conversion element.

17. A sheet conveying and reading apparatus according to claim 16, wherein said holding means serves also as said light-intercepting member.

18. A sheet conveying and reading apparatus according to claim 14, wherein said photoelectric conversion element is provided in a recess formed in said first transparent plate.

19. A sheet conveying and reading apparatus according to claim 14, wherein said light-intercepting member includes paint coated on said side edge surface.

20. A sheet conveying and reading apparatus according to claim 14, wherein said photoelectric conversion element is disposed between said first transparent plate and said second transparent plate.

21. A sheet conveying and reading apparatus according to claim 14, wherein said light-intercepting member covers a side edge surface from which light is incident.

22. An image reading apparatus comprising:
a transparent member of predetermined thickness having (1) a first surface which is for contacting an image surface, and (2) a second surface opposite said first surface;
a photoelectric conversion element abutting the second surface of said transparent member, for reading the image of the image surface through said transparent member; and
a light-intercepting member for covering a side edge surface of said transparent member to prevent light from entering the side edge surface.

23. An image reading apparatus according to claim 22, wherein said light-intercepting member includes a coating material applied to the side edge surface of said transparent member.

24. An image reading apparatus according to claim 23, wherein said light-intercepting member includes an adhesive agent applied to the side edge surface of said transparent member of predetermined thickness.

25. An image reading apparatus according to claim 22, further comprising a second transparent member of predetermined thickness disposed on the second surface of said transparent member, and wherein said photoelectric conversion element is disposed between said transparent member and said second transparent member.

26. An image reading apparatus according to claim 25, wherein said light-intercepting member covers a side edge surface of said second transparent member.

27. An image reading apparatus according to claim 26, further comprising illuminating means for illuminating the image surface through said transparent member.

28. An image reading apparatus according to claim 22, wherein said photoelectric conversion element is disposed in a recess formed in said transparent member.

29. An image reading apparatus according to claim 22, wherein said light-intercepting member includes paint coated on over said side edge surface.

30. An image reading apparatus according to claim 22, wherein said light-intercepting member covers a side edge surface from which light is incident.

* * * * *

UNITED STATES PATENT AND TRADEMARK OFFICE
CERTIFICATE OF CORRECTION

PATENT NO. : 4,959,536
DATED : September 25, 1990
INVENTOR(S) : Ijuin, et al.

It is certified that error appears in the above-identified patent and that said Letters Patent is hereby corrected as shown below:

COLUMN 3:

Line 45, "width-wise" should read --widthwise--.

COLUMN 4:

Line 29, "Of" should read --of--.

COLUMN 7:

Line 6, "means The" should read --means.  The--.

Line 38, "original For" should read --original.  For--.

COLUMN 10:

Line 15, "member of predetermined thickness." should read --member.--.

Signed and Sealed this

Second Day of June, 1992

Attest:

DOUGLAS B. COMER

Attesting Officer

Acting Commissioner of Patents and Trademarks